United States Patent
Qin

(10) Patent No.: US 8,829,846 B2
(45) Date of Patent: Sep. 9, 2014

(54) FIELD ORIENTED CONTROL OF A MOTOR WITH A SINGLE SHUNT

(75) Inventor: Ling Qin, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 636 days.

(21) Appl. No.: 13/211,045

(22) Filed: Aug. 16, 2011

(65) Prior Publication Data

US 2013/0043811 A1 Feb. 21, 2013

(51) Int. Cl.
*H02P 27/04* (2006.01)
*H02P 27/08* (2006.01)
*H02P 21/00* (2006.01)
*H02P 21/14* (2006.01)

(52) U.S. Cl.
CPC ............ *H02P 27/08* (2013.01); *H02P 21/0035* (2013.01); *H02P 21/146* (2013.01)
USPC .................. 318/811; 318/400.01; 318/400.02; 318/727; 318/767; 318/810

(58) Field of Classification Search
USPC ............... 318/400.01, 400.02, 700, 727, 767, 318/807, 810, 811
See application file for complete search history.

(56) References Cited

U.S. PATENT DOCUMENTS

| | | | |
|---|---|---|---|
| 5,886,498 A | 3/1999 | Sul et al. | |
| 6,563,496 B1 * | 5/2003 | Sakurai | 348/379 |
| 7,202,629 B2 | 4/2007 | Jadot et al. | |
| 7,208,908 B2 | 4/2007 | Anghel | |
| 7,339,344 B2 | 3/2008 | Borisavljevic | |
| 7,646,164 B2 | 1/2010 | Malrait et al. | |
| 7,808,201 B2 | 10/2010 | Borisavljevic | |
| 2001/0007416 A1 * | 7/2001 | Koide et al. | 318/701 |
| 2004/0104704 A1 * | 6/2004 | Hirono | 318/722 |
| 2010/0201298 A1 | 8/2010 | De Filippis | |
| 2011/0012544 A1 | 1/2011 | Schulz et al. | |
| 2012/0098472 A1 * | 4/2012 | Wrobel et al. | 318/400.11 |
| 2012/0249033 A1 * | 10/2012 | Qin | 318/400.32 |

OTHER PUBLICATIONS

"Sensorless V/f Control of High-Speed Surface Permanent Magnet Synchronous Motor Drives With Two Novel Stabilising Loops for Fast Dynamics and Robustness," IET Electr. Power Appl., vol. 4, Iss. 3, 2010, pp. 149-157 (Ancuti, et al.).

"A Comparison Between V/f Control and Position-Sensorless Vector Control for the Permanent Magnet Synchronous Motor," Proc. of the Power Conversion Conf., PCC Osaka 2002, pp. 1310-1315 (Itoh, et al.).

"A Sensorless, Stable V=f Control Method for Permanent-Magnet Synchronous Motor Drives," IEEE Trans. on Ind. Appl., vol. 39, No. 3, May/Jun. 2003, pp. 783-791 (Perera, et al.).

* cited by examiner

*Primary Examiner* — Kawing Chan
(74) *Attorney, Agent, or Firm* — John R. Pessetto; Frederick J. Telecky, Jr.

(57) ABSTRACT

A method for driving a motor is provided. Pulse width modulation (PWM) signals are generated from a voltage signal and a commanded angle signal, which drives a motor with multiple phases. A motor current from a motor is measured with a single shunt and converted into a digital signal. Based on the digital signal and the commanded angle signal, direct-axis and quadrant-axis currents for the motor can be determined, and the voltage signal and the commanded angle signal can be adjusted based at least in part on the direct-axis and quadrant-axis currents.

7 Claims, 5 Drawing Sheets

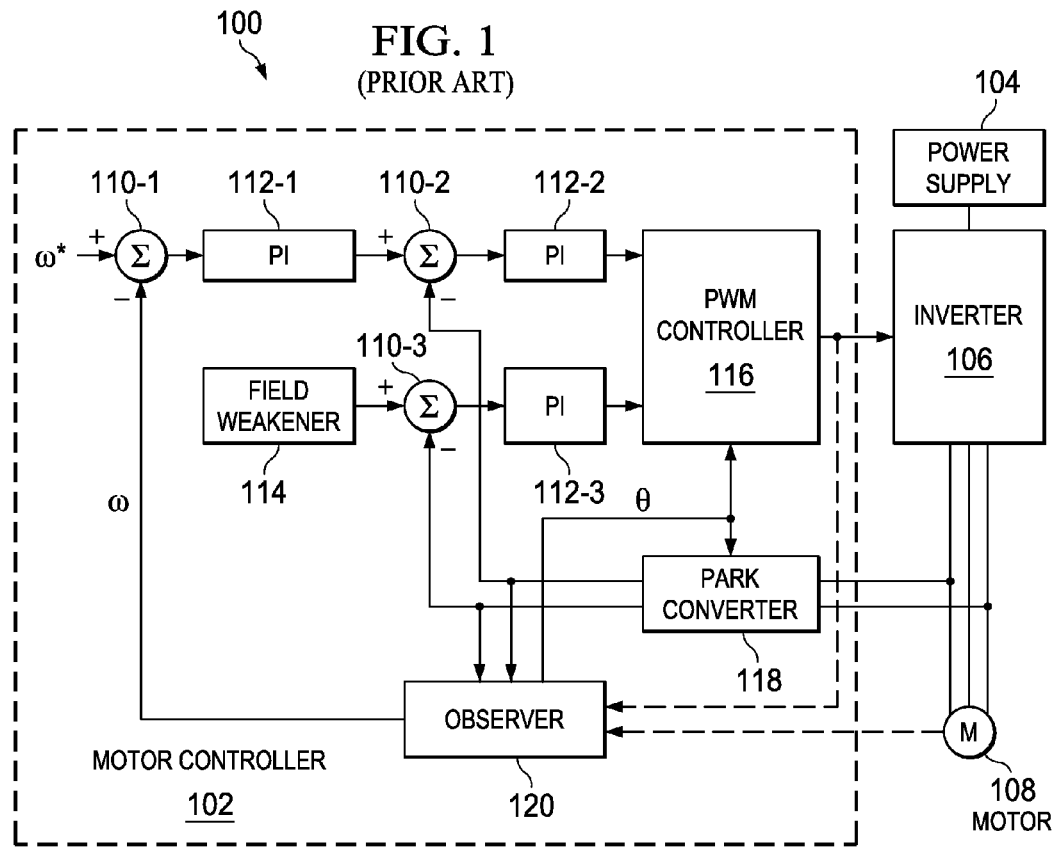

FIELD ORIENTED CONTROL OF A MOTOR WITH A SINGLE SHUNT

TECHNICAL FIELD

The invention relates generally to motor control and, more particularly, to sensorless control of a permanent magnet synchronous motor (PMSM), brushless direct current motor (BLDC), or an induction motor.

BACKGROUND

Turning to FIG. 1, a conventional system 100 can be seen. This system 100 generally comprises a motor controller 102, a power supply 104, an inverter 106, and a motor 108 (which is typically a PMSM, BLDC, or induction motor). In operation, the motor controller 102 provides generally continuous pulse width modulation (PWM) signals (i.e., 6 PWM signals if the motor 108 is a three-phase motor). These PWM signals are used to control the inverter 106, so that the inverter 106 can provide the commanded voltage to each phase of motor 108 from power supply 104.

The motor controller 102 provides control of motor 108 (through the application of the PWM signals) based on a field-oriented control (FOC) algorithm. For conventional FOC control, there are typically three control loops (one speed loop and two current loops) that are employed to provide adjustments. Typically, the observer 120 forms a portion of the speed loop and determines a feedback speed or feedback signal ω from the PWM signals (provided to the inverter 106) and from the motor 108. A difference between this feedback signal ω and a reference speed or reference signal ω* (which is determined by assert 110-1) is adjusted by the proportional-integral (PI) controller 112-1 to generate the reference torque current $i_q$* for the quadrature axis or q-axis. Additionally, a field weakener 114 provides the reference field current $i_d$* for the direct axis d-axis (in normal operation, $i_d$*=0 for PMSM and BLDC motors and $i_d$* is constant for induction motors). The observer 120 also determined the rotor position or angle and provides the angle signal θ to the Park converter 118 and PWM controller 116. The current loops generally include the Park converter 118, which determines currents $i_d$ and $i_q$ from phase current measurements and the angle signal θ. These currents $i_d$ and $i_q$ are then compared to or subtracted from the reference current $i_d$* and $i_q$* by adders 110-2 and 110-3, respectively, to generate errors $\Delta I_d$ and $\Delta I_q$. These errors $\Delta I_d$ and $\Delta I_q$ can then be further adjusted by PI controllers 112-2 and 112-3, and the commanded voltages $V_d$ and $V_q$, along with the angle signal θ (which form a voltage command vector $\vec{V}$), can be used to generate the PWM signals, and generation of the PWM signals is usually accomplished by an inverse Park transformation (performed by an inverse Park converter within PWM controller 116) and a space vector PWM generator (within the PWM controller 116) so as to generate three phase voltages.

Turning to FIGS. 2A and 2B, an example of the construction of a voltage command vector $\vec{V}$ from the voltage signals $V_q$* and $V_d$* and the commanded angle signal θ* for a three-phase motor can be seen. Typically, though, voltage signal $V_d$* much less than $V_q$*. The example voltage vector $\vec{V}$ is located in sector I (having an angle σ). From this voltage vector $\vec{V}$, there are two resultant projections $T_1$ and $T_2$ that correspond to intervals over which the vectors V1 and V2 are applied over the associated PWM period (shown in FIG. 2B). These intervals $T_1$ and $T_2$ and vectors V1 and V2 are typically generated by a space vector PWM (SVPWM) in PWM controller 116. For this example, one-half of each of intervals $T_1$ and $T_2$ (over which vectors V1 and V2 are applied, respectively) are located are at each end of the PWM period with the remainder of the PWM period being the zero vector V7 or V0 (where no current is flowing in a direct current link or DC-link single-shunt). For low speed and some operations, intervals $T_1$ and $T_2$ (either one or both) are very small (as shown in FIGS. 3A and 3B), so a fast (and costly) analog-to-digital converter (ADC), which performed the data conversion for Park converter 118, is generally employed.

Thus, there is a need for a lower cost motor controller.

Some examples of conventional systems are: U.S. Pat. No. 5,886,498; U.S. Pat. No. 7,202,629; U.S. Pat. No. 7,208,908; U.S. Pat. No. 7,339,344; U.S. Pat. No. 7,646,164; U.S. Pat. No. 7,808,201; U.S. Patent Pre-Grant Publ. No. 2010/0201298; U.S. Patent Pre-Grant Publ. No. 2011/0012544; Ancuti et al., "Sensorless V/f control of high-speed surface permanent magnet synchronous motor drives with two novel stabilizing loops for fast dynamics and robustness," *IET Electr. Power Appl.*, Vol. 4, Iss. 3, 2010, pp. 149-157; Itoh et al., "A comparison between V/f control and position-sensorless vector control for the permanent magnet synchronous motor," *Proc. of the Power Conversion Conf.*, 2002. PCC Osaka 2002, pg. 1310-1315; and Perera et al., "A Sensorless, Stable V=f Control Method for Permanent-Magnet Synchronous Motor Drives", *IEEE Trans. on Ind. Appl.*, Vol. 39, No. 3, May/June 2003.

SUMMARY

An embodiment of the present invention, accordingly, provides a method. The method comprises generating a plurality of pulse width modulation (PWM) signals from a voltage signal and a commanded angle signal; driving a motor with the plurality of PWM signals, wherein the motor has a plurality of phases; measuring a motor current from a motor with a single shunt; converting the motor current to a digital signal; determining at least one of a direct-axis current and a quadrant-axis current for the motor from the digital signal and the commanded angle signal; and adjusting the voltage signal and the commanded angle signal based at least in part on the direct-axis and quadrant-axis currents.

In accordance with an embodiment of the present invention, the method further comprises generating the voltage signal and the commanded angle signal from a reference signal.

In accordance with an embodiment of the present invention, the step of generating the voltage signal and the commanded angle signal from the reference signal further comprises: generating the voltage signal from a frequency of the reference signal; and integrating the reference signal to determine the commanded angle signal.

In accordance with an embodiment of the present invention, the motor current is a peak current.

In accordance with an embodiment of the present invention, the step of driving further comprises applying the plurality of PWM signals to an inverter.

In accordance with an embodiment of the present invention, the direct-axis current is $\|\vec{i_R}\| \cos \theta^*$, wherein $\|\vec{i_R}\|$ is the peak current and θ* is the commanded angle signal, and wherein the quadrant-axis current is $\|\vec{i_R}\| \cos \theta^*$.

In accordance with an embodiment of the present invention, the step of determining at least one of the direct-axis and quadrant-axis currents further comprises: determining the direct-axis current to be the motor current when the commanded angle is zero; and determining the quadrant-axis current to be the motor current when the commanded angle is 270°.

In accordance with an embodiment of the present invention, an apparatus is provided. The apparatus comprises an inverter; a motor that is coupled to the inverter; a shunt that is coupled to the inverter; a voltage generator that generates a voltage signal from a reference signal; an integrator that generates an angle signal from the reference signal; a feedback loop that is coupled to the shunt, wherein the feedback loop is configured to measure a motor current from the shunt, to determine direct-axis and quadrant-axis currents from the motor current and the commanded angle signal, and to generate a control signal; a first adder that adds the voltage signal to the control signal; a second adder that subtracts the control signal from the commanded angle signal; and a PWM controller that is coupled to the inverter and that generates a plurality of PWM signals in response to outputs from the first and second adders.

In accordance with an embodiment of the present invention, the feedback loop further comprises: a stator circuit that measures the envelop current and that determines the stator current; and a PI controller that generates the control signal based at least in part on the stator current measurement.

In accordance with an embodiment of the present invention, the PWM controller further comprises: an inverse Park converter that performs an inverse Park transformation on the voltage signal and the commanded angle signal; and a space vector PWM (SVPWM) generator that generates the plurality of PWM signals based at least in part on outputs from the inverse Park converter.

In accordance with an embodiment of the present invention, the stator circuit further comprises: a measurement circuit that is coupled to the shunt; and a stator current calculator that is coupled to the measurement circuit.

In accordance with an embodiment of the present invention, the voltage generator, the integrator, the first adder, the second adder, the stator calculator, the PI controller, and the inverse Park converter are implemented in software that is embodied on a processor and memory.

In accordance with an embodiment of the present invention, an analog-to-digital converter (ADC) that is coupled to the shunt.

In accordance with an embodiment of the present invention, the motor current is a peak current, and wherein the stator circuit further comprises an envelop detector coupled between the ADC and the shunt.

In accordance with an embodiment of the present invention, an apparatus is provided. The apparatus comprises an inverter; a motor that is coupled to the inverter; a shunt that is coupled to the inverter; a measurement circuit that is coupled to the shunt so as to measure a motor current; a processor having a memory with a computer program embodied thereon, the computer program including: computer code for generating a voltage signal and a commanded angle signal from a reference signal; computer code for determining at least one of a direct-axis current and a quadrant-axis current for the motor from the motor current and the commanded angle signal; and computer code for adjusting the voltage signal and the commanded angle signal based at least in part on the direct-axis and quadrant-axis currents; and a PWM generator that is coupled to the processor and the inverter, wherein the PWM generator receives the drive signals and generates a plurality of PWM signals from the drive signals.

In accordance with an embodiment of the present invention, the computer code for generating the voltage signal and the commanded angle signal from the reference signal further comprises: computer code for generating the voltage signal from a frequency of the reference signal; and computer code for integrating the reference signal to determine the commanded angle signal.

In accordance with an embodiment of the present invention, the measurement circuit further comprises an ADC that is coupled to the shunt and the processor.

In accordance with an embodiment of the present invention, the PWM generator further comprises an SVPWM generator, and wherein the computer program further comprises computer code for performing an inverse Park transformation on the voltage signal and the commanded angle signal.

In accordance with an embodiment of the present invention, wherein the motor current is a peak current, and wherein the measurement circuit further comprises an envelop detector that is coupled between the shunt and the ADC to measure the peak current, and wherein the direct-axis current is $\|\vec{i}_R\| \cos \theta^*$ wherein $\|\vec{i}_R\|$ is the peak current and $\theta^*$ is the commanded angle signal, and wherein the quadrant-axis current is $\|\vec{i}_R\| \cos \theta^*$.

In accordance with an embodiment of the present invention, the computer code for determining at least one of the direct-axis and quadrant-axis currents further comprises: computer code for determining the direct-axis current to be the motor current when the commanded angle is zero; and computer code for determining the quadrant-axis current to be the motor current when the commanded angle is 270°.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a diagram of an example of a conventional system;

FIG. 2A is a vector diagram depicting an example of a command voltage vector for the system of FIG. 1;

DETAILED DESCRIPTION

Figure 2B:
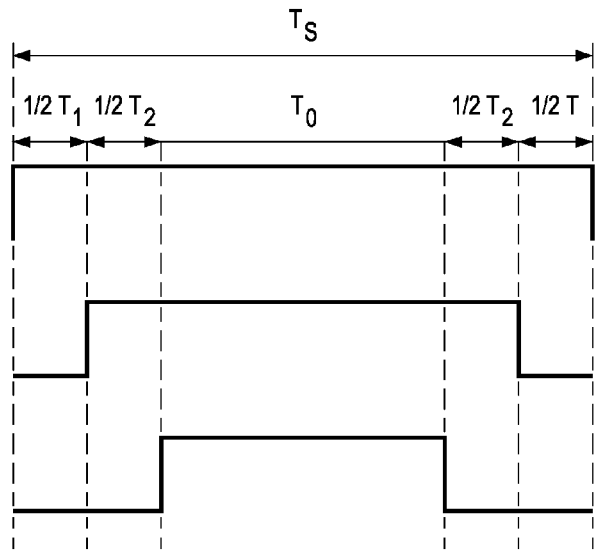
FIG. 2B is a SVPWM diagram for the voltage vector of FIG. 2A.

Refer now to the drawings wherein depicted elements are, for the sake of clarity, not necessarily shown to scale and wherein like or similar elements are designated by the same reference numeral through the several views.

Figure 3:
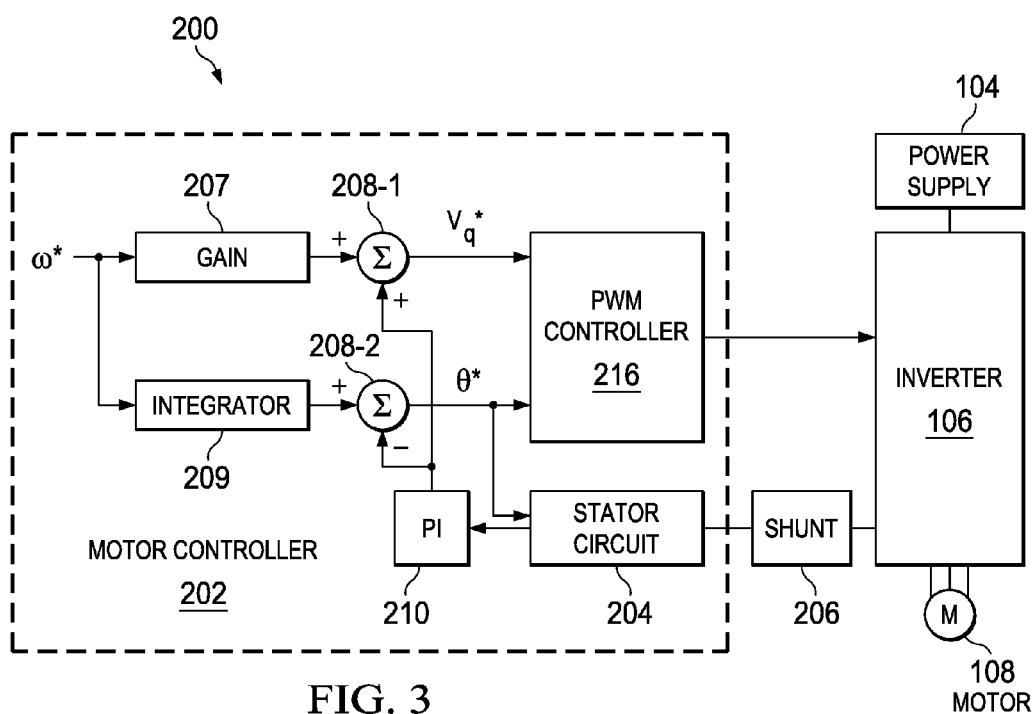
FIG. 3 is a diagram of an example of a system in accordance with an embodiment of the present invention.

Turning to FIG. 3, an example of a system 200 in accordance with an embodiment of the present invention can be seen. In operation, the motor controller 202 provides control of motor 108 (through the application of the PWM signals) based on a hybrid gain and field-oriented control (FOC), and, as shown, this motor controller 202 employs a current control loop to control the motor 108. A voltage generator 207 and integrator 209 are employed to generate the voltage signal $V_q^*$ and commanded angle signal $\theta^*$, respectively, from reference speed or reference signal $\omega^*$, and the stator circuit 204 is able to determine the measured stator currents $i_d$ and $i_q$ from shunt 206 and the command angle signal $\theta^*$. The measured stator currents $i_d$ and $i_q$ can then be used by the proportional-integral (PI) controller 210 (which can be comprised of multiple PI controllers) to generate a control signal. The voltage signal $V_q^*$ and commanded angle signal $\theta^*$ are then adjusted with the output of the PI controller 210 by way of adders 208-1 and 208-2, which adds and subtracts a control signal to and from the voltage signal $V_q^*$ and commanded angle signal $\theta^*$ (respectively). The PWM controller 216 then is able to convert the voltage signal $V_q^*$ and commanded angle signal $\theta^*$ to PWM signals (which are used to control the phases of motor 108) by way of an inverse Park converter and a space vector PWM (SVWPM) controller. Additionally, each of the voltage generator 207, integrator 209, adders 208-1 and 208-2, PI controller 210, inverse Park converter (which is generally part of the PWM controller 216), and SVPWM (which is generally part of the PWM controller 216) can be implemented in hardware or in software that is stored in a memory and embodied on a processor.

Figure 4A:
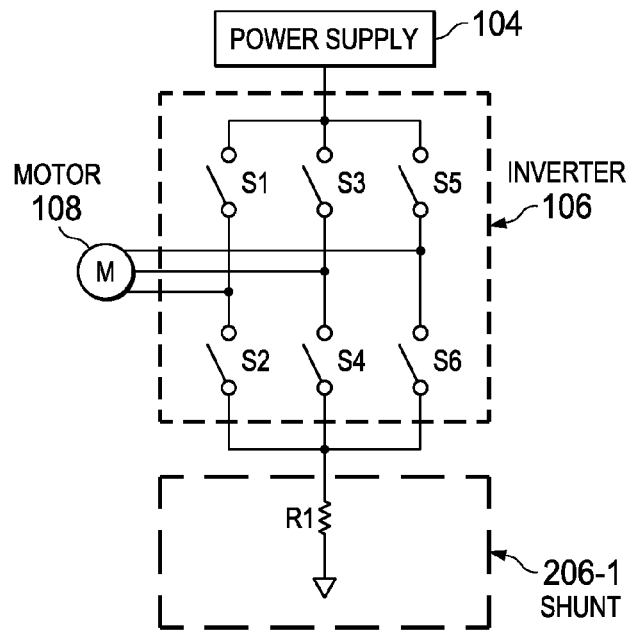
FIGS. 4A and 4B are diagrams of examples of configurations for the shunt of FIG. 3.
Figure 4B:
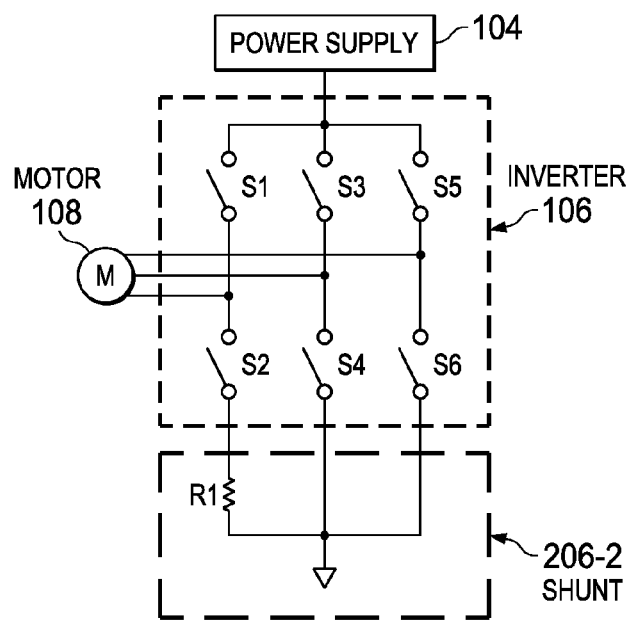

As a result, system 200 has a significant advantage over system 100 in that the two shunts of system 100 (shown as the two connections to motor 108) have been replaced with a single shunt 206 without the need for a high performance ADC and without further introduction of noise. Examples of shunt 206 (which are labeled 206-1 and 206-2) can be seen in FIGS. 4A and 4B. As shown, the inverter 106 is generally comprised of switches S1 to S6, where each pair of switches S1/S2, S3/S4, and S5/S6 are each coupled to one of the phases of the motor 108, and a resistor R1 can form the shunt 206. For the configuration shown in FIG. 4A, resistor R1 for shunt 206-1 is coupled to each pair of switches S1/S2, S3/S4, and S5/S6 (and each phase of motor 108), and for the configuration shown in FIG. 4B, resistor R1 is coupled to one of the switch pair S1/S2 (although resistor R1 can be coupled to any of the switch pairs S1/S2, S3/S4, or S5/S6.

Additionally, the Park converter 118 has been replaced with stator circuit 204. The stator circuit 204 generally includes an ADC (where the shunt 206 and ADC can collectively be considered to be a measurement circuit) and stator current calculator (which can be implemented in hardware or software). Depending on the configuration of the shunt 206 (namely, if shunt 206-1 is employed), stator circuit 204 can also include an envelop detector. By having this arrangement, stator calculator does not perform a Park transformation, but, instead, can directly calculate the stator currents $i_d$ and $i_q$. Typically, for shunt 206-1, a hardware envelop detector (which can detect an envelop current by eliminating narrow pulses and noises or a peak current) is employed, and, for both shunt 206-1 and 206-2, the envelop detector can be implemented in software or hardware.

To preface, for a typical Park transformation (as shown in equation (1) below), stator currents $i_d$ and $i_q$ are constructed or calculated from two or three phases (of a three phase motor, for example) and a commanded angle signal $\theta^*$.

$$\begin{pmatrix} i_d \\ i_q \end{pmatrix} = \frac{2}{3} \begin{pmatrix} \cos\theta^* & \cos\left(\theta^* - \frac{2\pi}{3}\right) & \cos\left(\theta^* + \frac{2\pi}{3}\right) \\ -\sin\theta^* & -\sin\left(\theta^* - \frac{2\pi}{3}\right) & -\sin\left(\theta^* + \frac{2\pi}{3}\right) \end{pmatrix} \begin{pmatrix} i_a \\ i_b \\ i_c \end{pmatrix} \quad (1)$$

This is the transformation undertaken by Park converter 118 of system 100, and elimination of one or two of the shunts (so as to use the single shunt 206) is very difficult using the arrangement of FIG. 1. Yet, this is achievable with the use of envelop circuit 204 (which is generally comprised of an envelop detector and ADC) if some approximations are made.

Looking to the voltage vector $\vec{V}$ of FIGS. 2A and 2B as an example to illustrate the approximations used by the system 200, the motor equations in the synchronous frame are:

$$V_d = i_d R_s + L_d \cdot \frac{di_d}{dt} - \omega \Psi_q, \quad (2)$$

$$V_q = i_q R_s + L_q \cdot \frac{di_q}{dt} + \omega \Psi_d, \quad (3)$$

$$\Psi_d = i_d L_d + \Psi_m, \quad (4)$$

and $$\Psi_q = i_q L_q, \quad (5)$$

where $\omega$ is the angular speed, $V_d$ and $V_q$ are stator voltages for the d-axis and q-axis, respectively, $\Psi_d$ and $\Psi_q$ are flux linkages for the d-axis and q-axis, respectively, $L_d$ and $L_q$ are stator inductances for the d-axis and q-axis, respectively, $\Psi_m$ is the flux linkage of the permanent magnet, and $R_s$ is the stator resistance. Because stator inductances $L_d$ and $L_q$ are small while current $i_q$ is small, flux linkage $\Psi_d$ is approximately equal to flux linkage of the permanent magnet $\Psi_m$, while flux linkage $\Psi_q$ is approximately equal to zero. As a result, equations (2) through (5) can be reduced as follows:

$$V_d = i_d R_s + L_d \cdot \frac{di_d}{dt} - \omega \Psi_q \approx i_d R_s \approx 0, \quad (6)$$

$$V_q = i_q R_s + L_q \cdot \frac{di_q}{dt} + \omega \Psi_d \approx i_q R_s + \omega \Psi_d \approx \omega \Psi_d, \quad (7)$$

$$\Psi_d = i_d L_d + \Psi_m \approx \Psi_m, \quad (8)$$

and $$\Psi_q = i_q L_q \approx 0, \quad (9)$$

From equations (6) and (7), the magnitude of voltage vector $\vec{V}$ is:

$$\|\vec{V}\| \approx V_q \approx \omega \Psi_m, \quad (10)$$

Thus, from equation (10), the rotor quadrant position is approximately in alignment with the resultant voltage command (i.e., voltage vector $\vec{V}$) in stable control of a motor 108 (which can, for example, be a PMSM, BLDC motor, or induction motor).

Figure 5A:
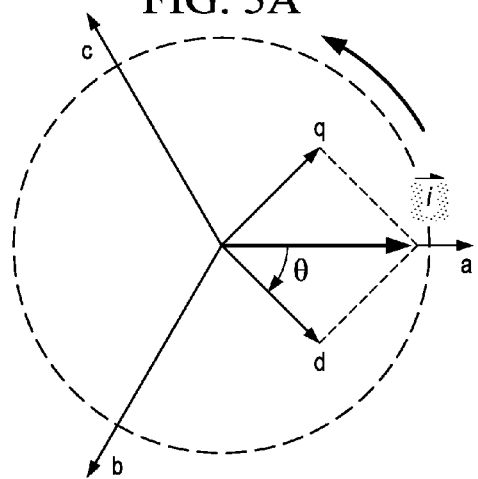
FIGS. 5A to 5F are diagrams depicting examples of a resultant current vector for the system of FIG. 3.
Figure 5B:
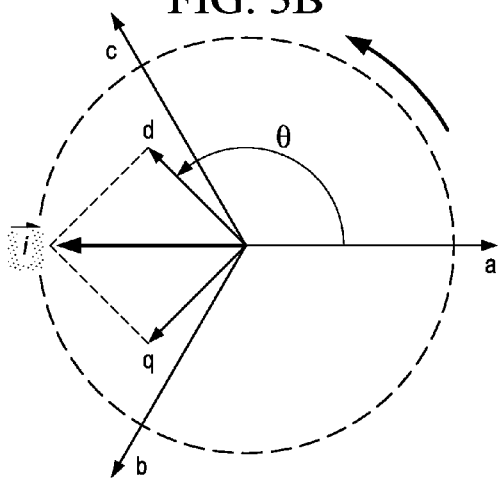

From this, it follows that stator currents $i_d$ and $i_q$ can be determined from a current measurement and the commanded angle signal $\theta^*$. Turning back to equation (1) and employing either shunt 206-1 or 206-2, when phase a (for example) reaches a peak, then the resultant current vector $\vec{i_R}$ is aligned with the a-axis (as shown in FIG. 5A) or anti-aligned with the a-axis (as shown in FIG. 5B). The measurement by shunt 206 should then be at a peak, that is:

$$\max(i_a) = \|\vec{i_R}\| \tag{11}$$

Stator currents $i_d$ and $i_q$, then, are $$i_d = \|\vec{i_R}\| \cos \theta^* \tag{12}$$

$$i_q = \|\vec{i_R}\| \sin \theta^* \tag{13}$$

Because stator circuit 204 determines a peak current, the stator current calculator (within envelop circuit 204) is able to use the peak current (which is $\|\vec{i_R}\|$) in conjunction with the commanded angle signal $\theta^*$ to generate a control signal. Thus, it becomes practical to determine stator currents $i_d$ and $i_q$ without performing a Park transformation or a narrow ADC pulse.

Alternatively, when shunt 206-1 or 206-2 is employed, the rotor position may be used instead of a peak current to directly calculate currents $i_d$ and $i_q$. Turning, again, back to equation (1), when the commanded angle signal $\theta^*$ becomes 0, the equation (1) becomes:

$$i_d = \frac{2}{3}\left(\cos 0 \quad \cos\left(-\frac{2\pi}{3}\right) \quad \cos\left(+\frac{2\pi}{3}\right)\right)\begin{pmatrix} i_a \\ i_b \\ i_c \end{pmatrix} = \frac{2}{3}\left(i_a - \frac{1}{2}i_b - \frac{1}{2}i_c\right) = i_a \tag{14}$$

Figure 5C:
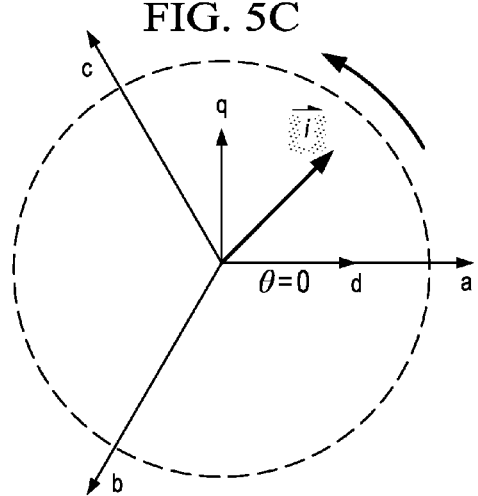
Figure 5D:
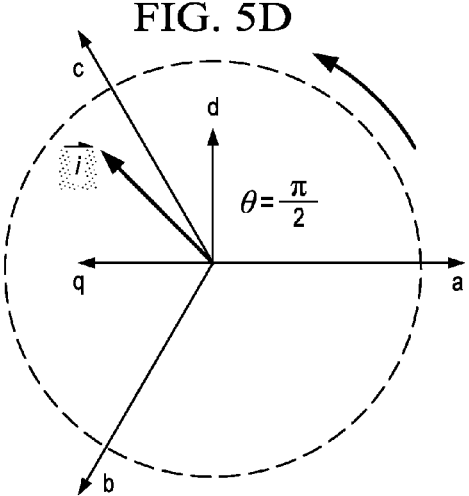
Figure 5E:
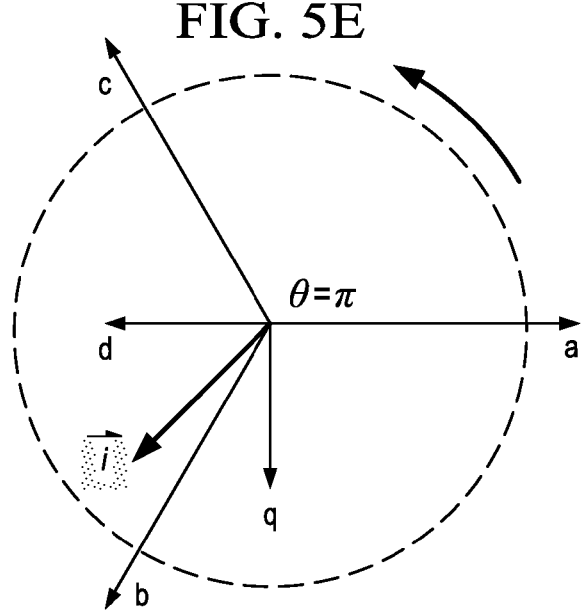
Figure 5F:
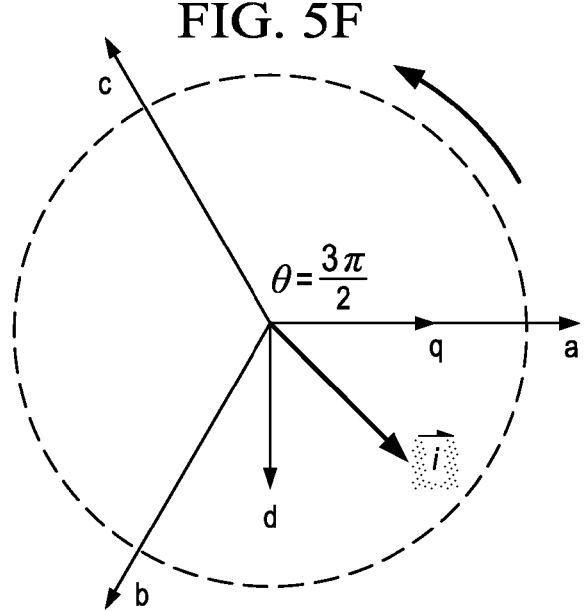

This means that the vector for current $i_d$ is aligned with the a-axis (as shown in FIG. 5C). Similarly, (as shown in FIGS. 5D through 5F), the stator currents $i_d$ and $i_q$ become:

$$i_q = -i_a \text{ for } \theta^* = \frac{\pi}{2} = 90° \tag{15}$$

$$i_d = -i_a \text{ for } \theta^* = \pi = 180°$$

$$i_q = i_a \text{ for } \theta^* = \frac{3\pi}{2} = 270°$$

Again, it becomes practical to use the configuration for both shunts 206-1 and 206-2 and determine stator currents $i_d$ and $i_q$ without performing a Park transformation.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   an inverter;
   a motor that is coupled to the inverter;
   a shunt that is coupled to the inverter;
   a voltage generator that generates a voltage signal from a reference signal;
   an integrator that generates an angle signal from the reference signal;
   a feedback loop that is coupled to the shunt, wherein the feedback loop is configured to measure a motor current from the shunt, to determine direct-axis and quadrant-axis currents from the motor current and the commanded angle signal, and to generate a control signal;
   a first adder that adds the voltage signal to the control signal;
   a second adder that subtracts the control signal from the commanded angle signal; and
   a PWM controller that is coupled to the inverter and that generates a plurality of PWM signals in response to outputs from the first and second adders.

2. The apparatus of claim 1, wherein the feedback loop further comprises:
   an stator circuit that measures the motor current and that determines the stator current; and
   a PI controller that generates the control signal based at least in part on the stator current measurement.

3. The apparatus of claim 2, wherein the PWM controller further comprises:
   an inverse Park converter that performs an inverse Park transformation on the voltage signal and the commanded angle signal; and
   a space vector PWM (SVPWM) generator that generates the plurality of PWM signals based at least in part on outputs from the inverse Park converter.

4. The apparatus of claim 3, wherein the stator circuit further comprises:
   a measurement circuit that is coupled to the shunt; and
   a stator current calculator that is coupled to the measurement circuit.

5. The apparatus of claim 4, wherein the voltage generator, the integrator, the first adder, the second adder, the stator calculator, the PI controller, and the inverse Park converter are implemented in software that is embodied on a processor and non-transitory memory.

6. The apparatus of claim 5, wherein the measurement circuit further comprises an analog-to-digital converter (ADC) that is coupled to the shunt.

7. The apparatus of claim 6, wherein the motor current is a peak current, and wherein the stator circuit further comprises an envelope detector coupled between the ADC and the shunt.

* * * * *